(12) United States Patent
Wholley et al.

(10) Patent No.: US 12,710,582 B2
(45) Date of Patent: Aug. 18, 2026

(54) FLEXIBLE LIGHT SHIELD FOR A LIGHT PIPE

(71) Applicant: ARRIS Enterprises LLC, Horsham, PA (US)

(72) Inventors: Ross A. Wholley, Haverhill, MA (US); Thomas D. Fillio, Newton, NH (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/796,916

(22) Filed: Aug. 7, 2024

(65) Prior Publication Data

US 2025/0052943 A1 Feb. 13, 2025

Related U.S. Application Data

(60) Provisional application No. 63/531,110, filed on Aug. 7, 2023.

(51) Int. Cl.
*F21V 8/00* (2006.01)

(52) U.S. Cl.
CPC ......... *G02B 6/0096* (2013.01); *G02B 6/0073* (2013.01); *G02B 6/0083* (2013.01); *G02B 6/0091* (2013.01)

(58) Field of Classification Search
CPC .. G02B 6/0096; G02B 6/0073; G02B 6/0083; G02B 6/0091
See application file for complete search history.

(56) References Cited

U.S. PATENT DOCUMENTS 4,072,424 A * 2/1978 McMullan ......... G01N 21/8507 356/442
7,329,034 B2 * 2/2008 Verdes ................. G02B 6/0006 362/555
10,725,235 B2 * 7/2020 Ritter ..................... H05K 1/181
2008/0165542 A1 * 7/2008 Kim ....................... G02B 5/045 362/330

FOREIGN PATENT DOCUMENTS

JP 6402941 B2 * 10/2018 ........... G02B 6/0088

* cited by examiner

*Primary Examiner* — Abdulmajeed Aziz
*Assistant Examiner* — Jessica M Apenteng
(74) *Attorney, Agent, or Firm* — Chernoff, Vilhauer, McClung & Stenzel, LLP

(57) ABSTRACT

A flexible light shield for a light pipe.

9 Claims, 12 Drawing Sheets

FLEXIBLE LIGHT SHIELD FOR A LIGHT PIPE

CROSS REFERENCE TO RELATED APPLICATIONS

The present application claims priority to U.S. Provisional Application No. 63/531,110 filed Aug. 7, 2023, the content of which is incorporated herein by reference in its entirety.

BACKGROUND

The subject matter of this application relates to a flexible light shield for a light pipe.

Right-angle, circuit-board-mounted, lighted indicators have been used to provide visual status information relating to the functions of electronic equipment with which they are used. These often use "through-hole" light-emitting diodes (LEDs) with leads bent at a right angle so the direction of light is parallel to the usually horizontally positioned, printed circuit boards on which they are mounted. They are often directed through a vertically positioned front panel of the equipment. Plastic housings for mounting flush on the circuit boards to which the LEDs are secured may be used to improve the directional alignment.

A light pipe array which mounts to the circuit board may be used to redirect light in a desired direction. Such "light pipes" can be used to direct light from a circuit board, typically from a horizontally oriented circuit board, to a front face of electronics, typically a vertically oriented face plate, arranged as a 90 degree angle with respect to the horizontally oriented circuit board. However, depending on the intensity of the light from light emitting diodes, there may be substantial crosstalk between adjacent light pipes which may be unacceptable. Furthermore, there is a substantial amount of light from a particular light source (e.g., LED) aligned with a particular light pipe that enters the other light pipes, again resulting in undesirable light in non-aligned light pipes. High mechanical tolerances between the light pipe, the circuit board, the circuit board-to-chassis mounting, and the chassis can make assembly difficult.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
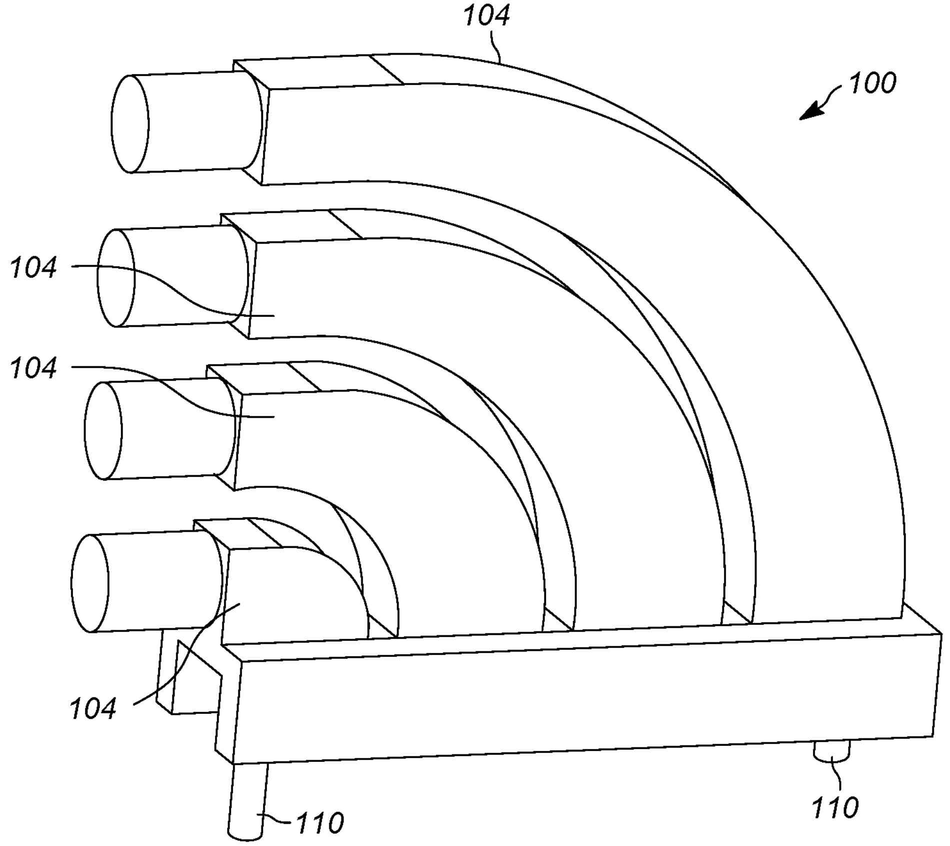
FIG. 1 illustrates a light guide.
Figure 2:
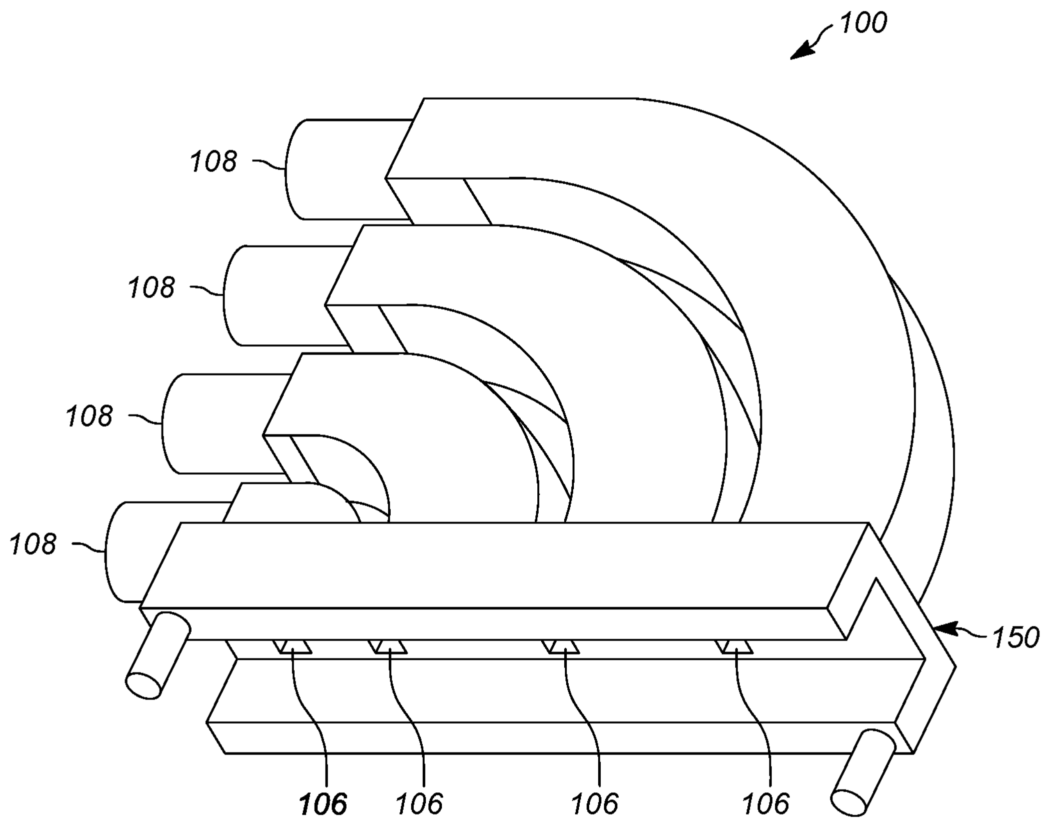
FIG. 2 illustrates another view of the light guide of FIG. 1.

Referring to FIG. 1, a light guide 100 may be constructed from an optically transmissive material, such as polycarbonate. The light guide 100 may include a plurality of individual light pipes 104. Referring also to FIG. 2, each of the individual light pipes are preferably curved to provide a 90-degree bend (or substantially 90 degrees) from a horizonal lower opening 106 to a vertical upper opening 108. The individual light pipes may each provide a different degree of bend, depending on the location of the light source and the light output. Preferably, each of the individual light pipes is curved in a two-dimensional plane, although each of the individual light pipes may be cured in three-dimensions, if desired. Each of the individual light pipes, and the openings thereof 106, 108, are preferably aligned with one another in a linear arrangement. Each adjacent individual light pipes, and the openings thereof 106, 108, are preferably spaced apart from one another in a uniform arrangement, although the spacings between the openings thereof 106, 108 may be different from one another. Each of the light sources may have one or more colors, such as red, green, and blue.

Figure 3:
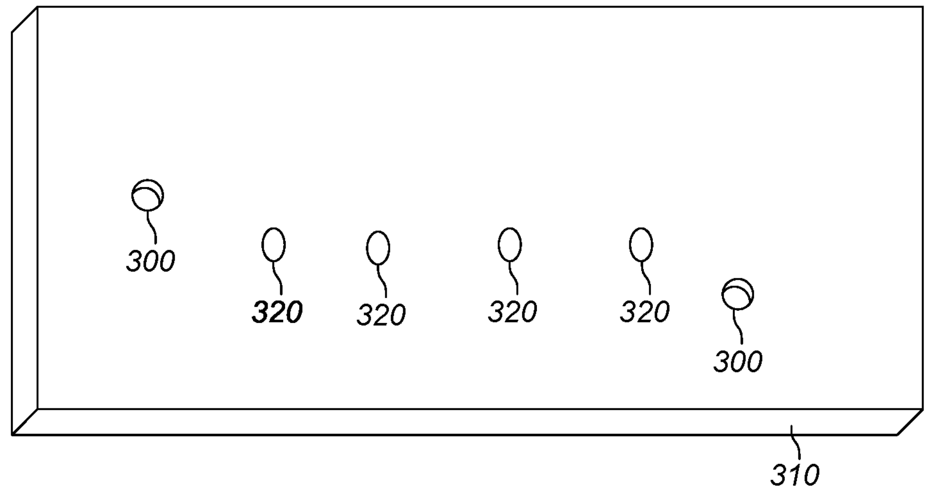
FIG. 3 illustrates a circuit board with a pair of openings and four light emitting diodes.

Referring to FIG. 3, the light guide 100 may be aligned with a pair of pins, such as pins 110 into a pair of corresponding openings 300 defined by a circuit board 310. A set of light emitting elements 320, such as light emitting diodes, may be supported by the circuit board 310. The light emitting elements 320 are aligned with the lower openings 106 of the light guide 100. The light emitting elements 320 may be any type of light source.

Figure 4:
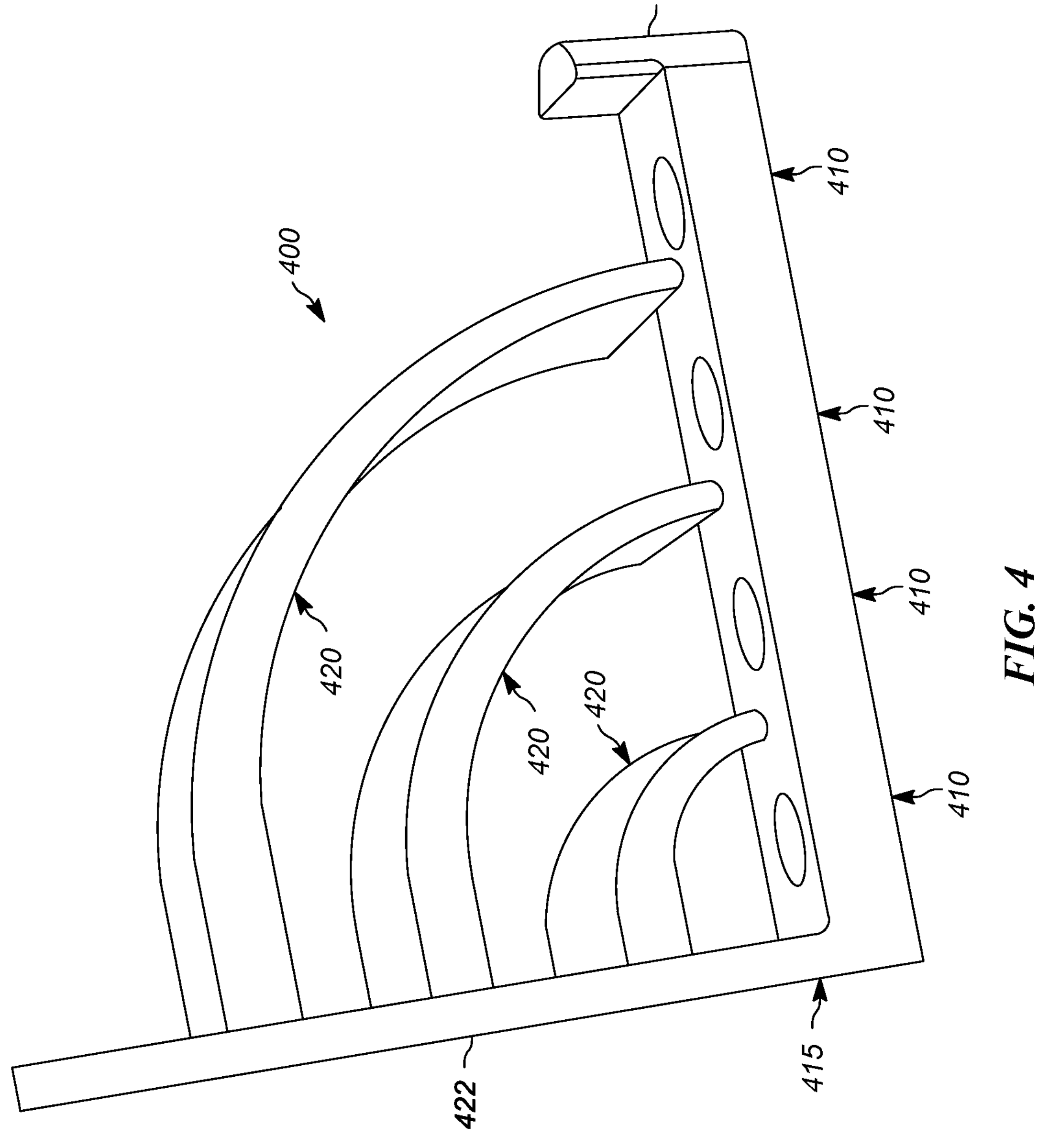
FIG. 4 illustrates a light shield.

Referring to FIG. 4, a light shield 400 may be constructed from a flexible material, such as silicon. The light shield 400 is more flexible than the light pipes 104. The light shield 400 includes a set of openings 410 that are spaced and positioned to be aligned with the light emitting elements 310 and/or the lower openings 106 of the light guide 100. The light shield 400 includes a lower body 415 sized to be engaged with a lower opening 150 defined by the light guide 100. For example, the lower body 415 and the lower opening 150 may define a rectangular shape, although other shapes may likewise be used. The light from each of the light emitting elements 320 is directed up a respective one of the set of openings 410. The depth (preferably greater than half an inch) of each of the respective set of openings 410 tends to direct a substantial amount of the light in a generally vertical direction. The light shield 400 includes a plurality of curved fins 420 attached to a side member 422.

Figure 5:
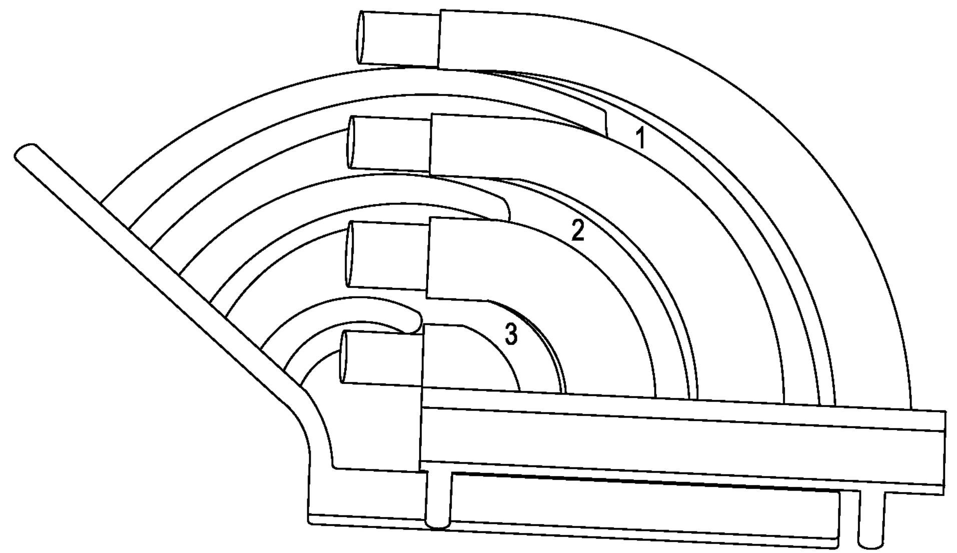
FIG. 5 illustrates a step in the engagement of the light shield with the light guide.
Figure 6:
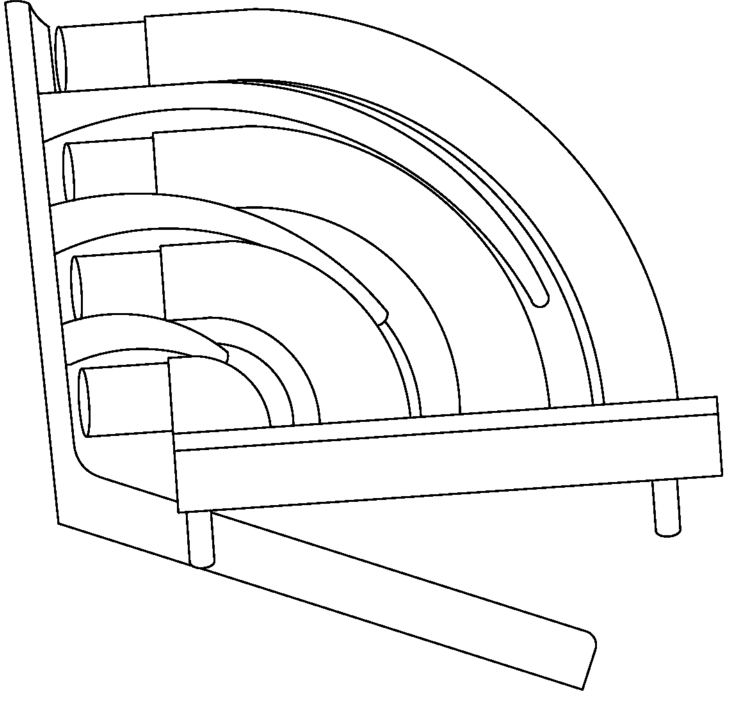
FIG. 6 illustrates a step in the engagement of the light shield with the light guide.

Referring to FIG. 5, the light shield 400 and the light guide 100 are engaged with one another. The silicon fins 420 (fin 1, fin 2, fin 3) are straightened out and aligned to a corresponding slot between the light pipes 104. The silicon fins 420 are slowly fed through each corresponding slot in the light guide 100. This is preferably performed by feeding fin 1 into slot 1 until the tip of fin 2 reaches the opening of slot 2. At this point begin to slowly feed both fin 1 and fin 2 into their slots. Proceed to fin 3 in the same way as was performed regarding fin 1 and fin 2. It may assist to fold the side rearwardly such that it is generally perpendicular to the fins during this process. The fins are continued to be fed into their slots until the front flap of the shield reaches the light pipe as illustrated in FIG. 6. The silicon fins 420 preferably have a sufficient width to be substantially as wide as (within +/−10% of the width) of the respective light pipes 104 adjacent thereto.

Figure 7:
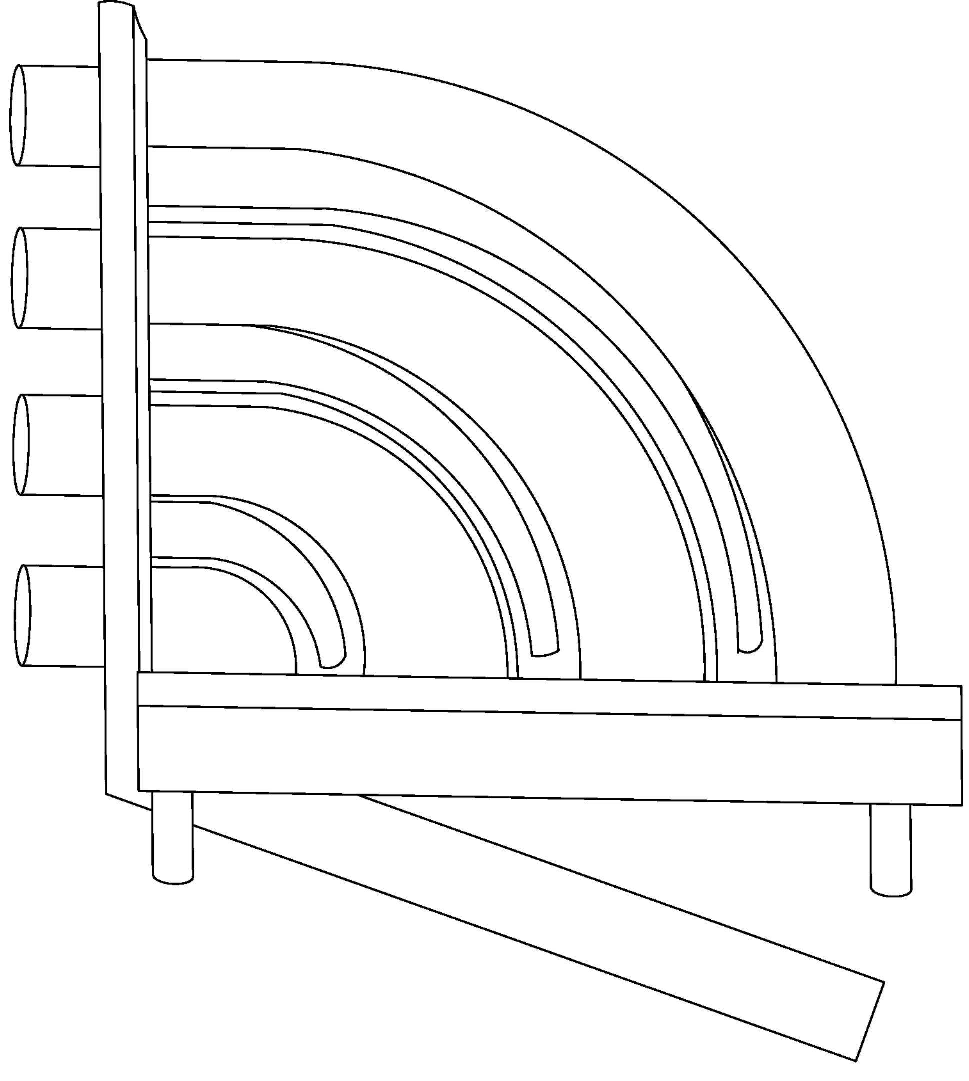
FIG. 7 illustrates a step in the engagement of the light shield with the light guide.

Referring to FIG. 6 and FIG. 7, preferably it is ensured that all three fins have been fed into their corresponding slots. Then being feeding the round part of each pipe through their respective hole in the silicon shield. This is continued until the square face of the light pipe and the silicon face are flush together.

Figure 8:
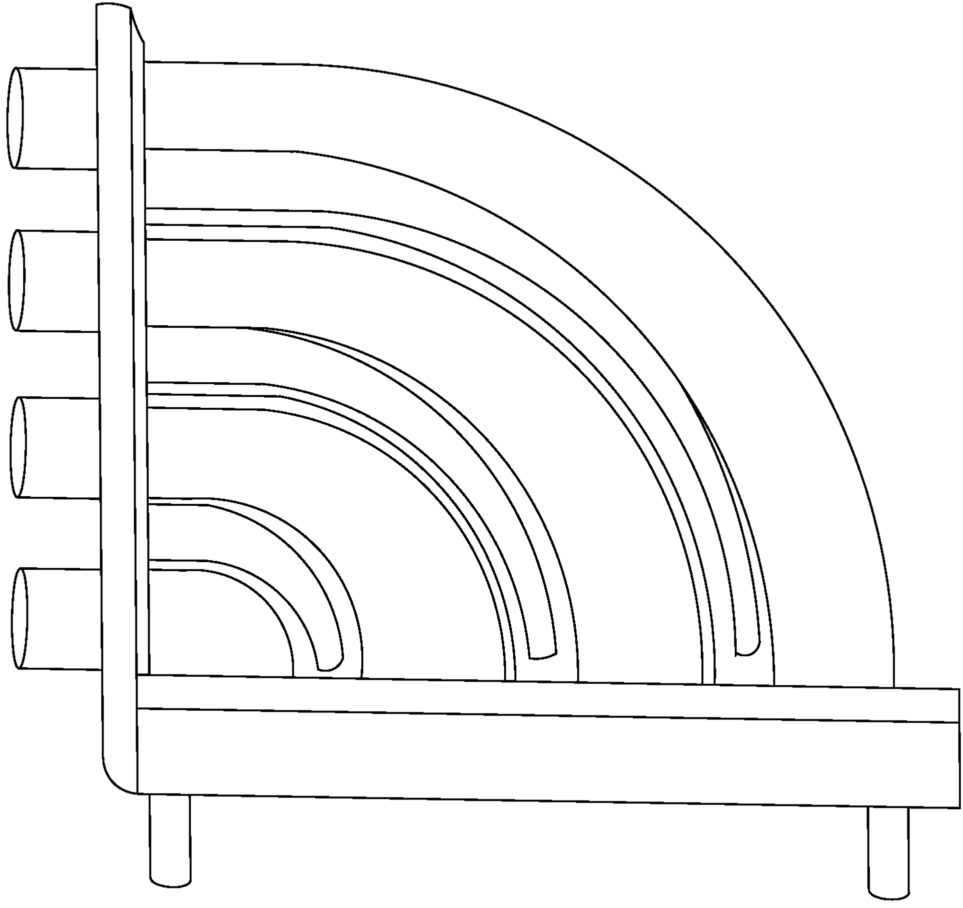
FIG. 8 illustrates a step in the engagement of the light shield with the light guide.
Figure 9:
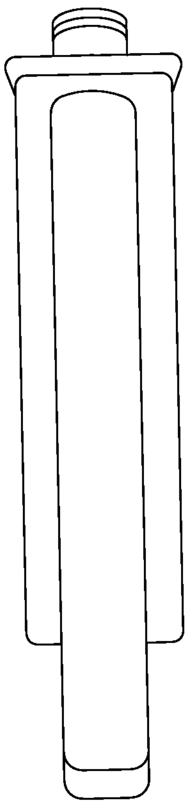
FIG. 9 illustrates a step in the engagement of the light shield with the light guide.

Referring to FIG. 8, the base of the silicon shield is fit into the bottom channel of the light pipe. It may be useful to lightly stretch the base of the shield past the end of the light pipe channel as it is fitted, such that it will elastically snap into place. Preferably, all sections of the silicon shield are fitted flush to the light pipe. The fins are adjusted such that they are centered in their slots as shown in FIG. 9.

Figure 10:
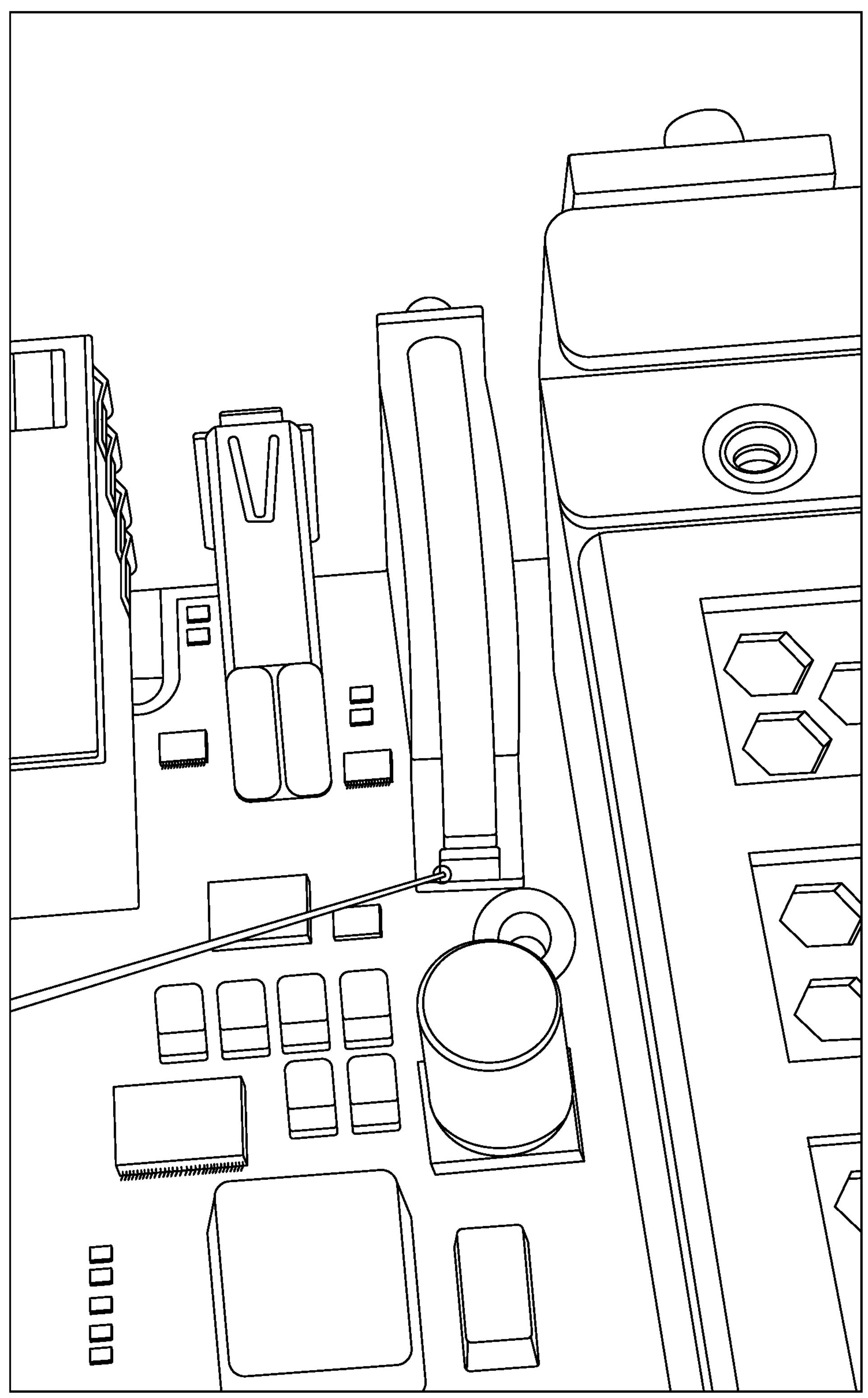
FIG. 10 illustrates an assembly supported by a circuit board.
Figure 11:
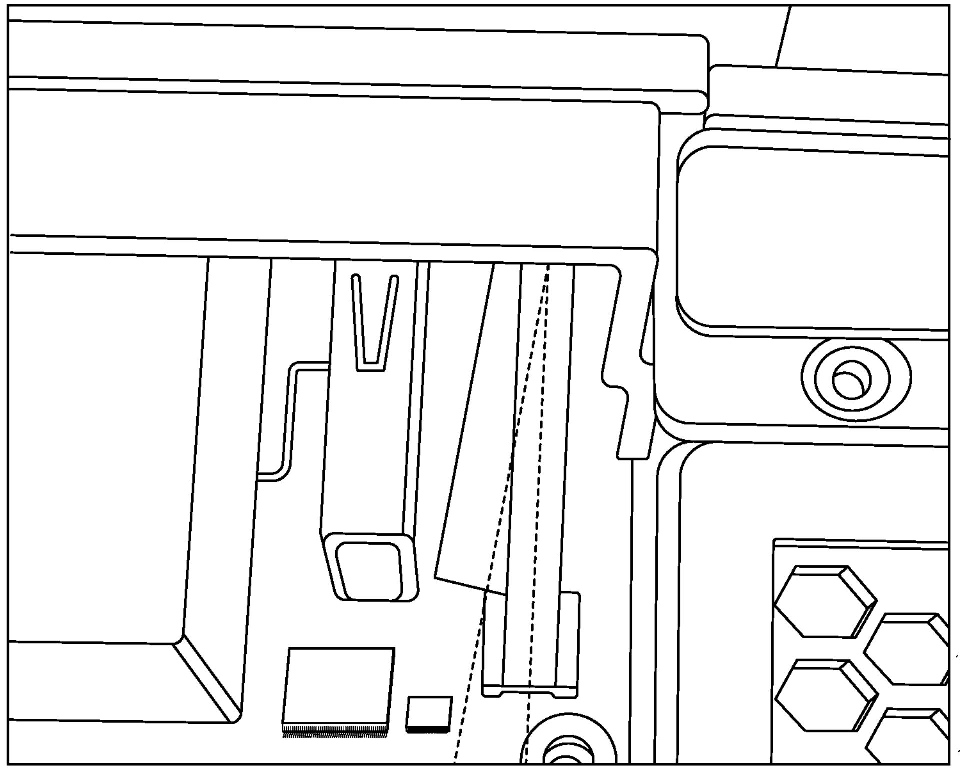
FIG. 11 illustrates the assembly supported by a circuit board.
Figure 12:
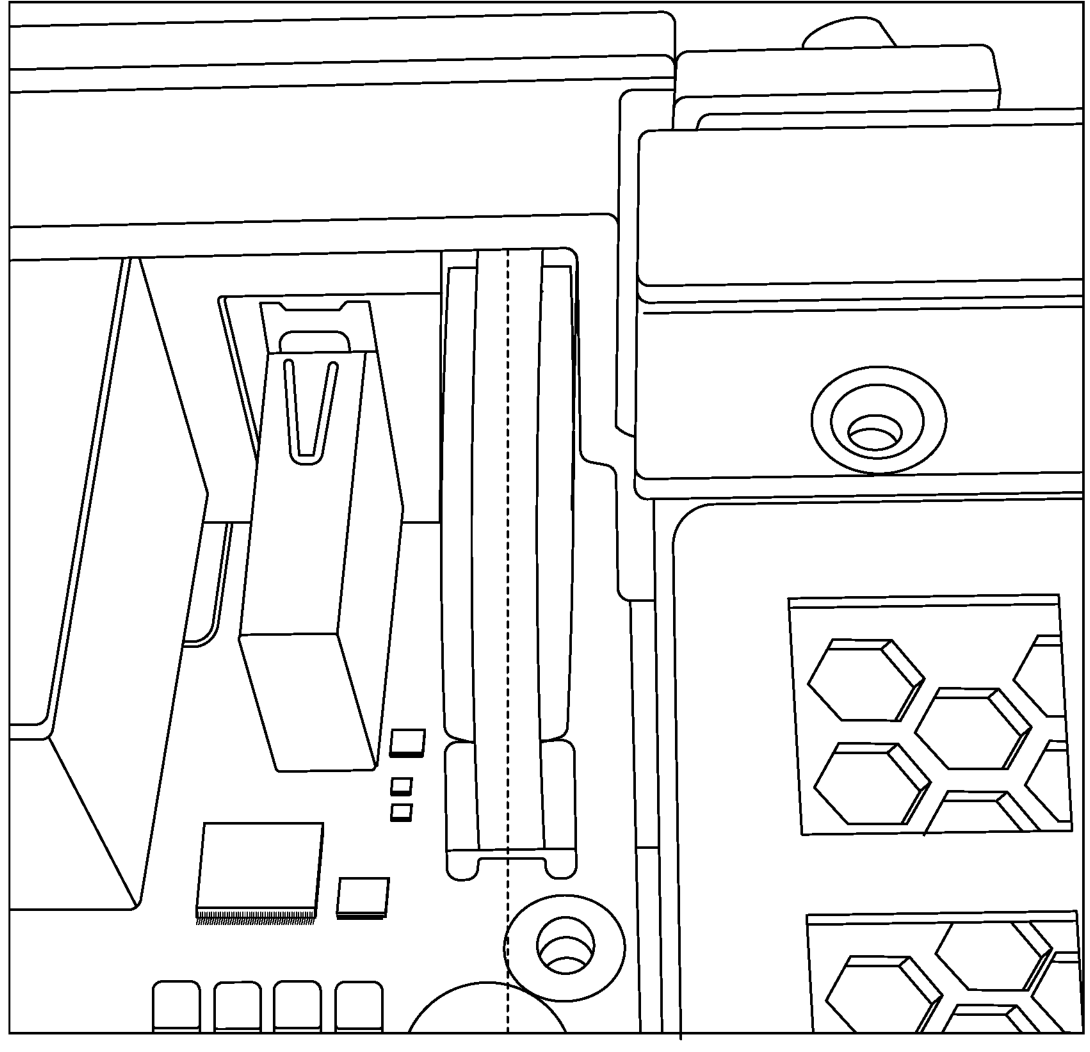
FIG. 12 illustrates the assembly supported by a circuit board.

Referring to FIG. 10, the assembly is press fit flush to a circuit board. The assembly is secured to the circuit board. Referring also to FIG. 11 and FIG. 12, during the installation of the face place the fins may shift out of alignment. If the fins come out of alignment, they should be pushed back into place.

Referring again to FIG. 4, the assembly may include the light shield and the light guide being engaged with one another, together with an end tab 500 that is of assistance in the assembly process.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An assembly for directing light comprising:

(a) a light guide having a plurality of optical light pipes, each of which are constructed from an optically transmissive material, having a curved path to direct light from a plurality of light emitting elements supported by a circuit board to panel of a housing for said circuit board, said light guide including a lower portion supporting said plurality of optical light pipes, said light guide constructed from material having a first flexibility;

(b) a light shield, said light shield constructed from material having a second flexibility, where said second flexibility is greater than said first flexibility, said light shield including a plurality of fins, said light shield including a lower portion supporting said plurality of fins;

(c) said plurality of fins detachably engageable with said optical light pipes wherein each of said plurality of fins is positioned between adjacent ones of said plurality of optical light pipes in such a manner that said adjacent ones of said plurality of optical light pipes has a corresponding one of said plurality of fins therebetween, said lower portion supporting said plurality of optical light pipes is detachably engageable with said lower portion supporting said plurality of fins.

2. The assembly of claim 1 wherein said optically transmissive material is polycarbonate.

3. The assembly of claim 1 wherein said light emitting elements are light emitting diodes.

4. The assembly of claim 1 wherein said curved path is substantially 90-degrees.

5. The assembly of claim 1 wherein said curved path is curved in a two-dimensional plane and not in a three-dimensional plane.

6. The assembly of claim 1 wherein said plurality of optical light pipes are arranged in a linear arrangement with respect to one another.

7. The assembly of claim 6 wherein the spacing between each of said plurality of optical light pipes and a next adjacent light pipe are the same.

8. The assembly of claim 1 wherein said light shield is silicon.

9. The assembly of claim 1 wherein said optical light pipes is one more than said plurality of fins.

* * * * *